Oct. 11, 1966   J. MARTIN   3,277,545
LATCHES
Filed July 1, 1964
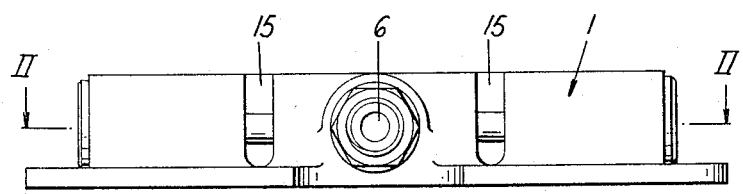
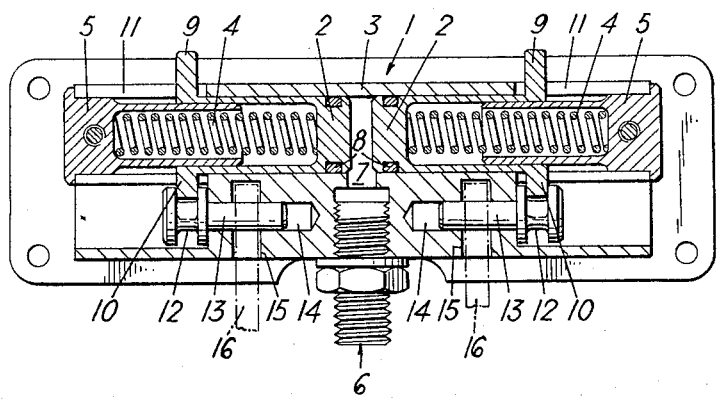
Inventor
JAMES MARTIN

United States Patent Office 3,277,545
Patented Oct. 11, 1966

3,277,545
LATCHES
James Martin, Southlands Road, Denham, near Uxbridge, Middlesex, England
Filed July 1, 1964, Ser. No. 379,542
Claims priority, application Great Britain, July 30, 1963, 30,094/63
2 Claims. (Cl. 24—205.17)

This invention concerns latches.

My co-pending patent application Ser. No. 258,830, filed Feb. 15, 1963, now Patent No. 3,180,593, concerns an aircraft escape system in preferred embodiments of which stored pressure fluid, e.g. compressed air, is utilised to effect, inter alia, the ejection of the aircraft ejection seat from a submerged aircraft. In certain embodiments of such system upward movement of the aircraft ejection seat against the internal surface of the cockpit canopy of the aircraft actuates means on the seat that rupture the canopy to enable the seat to be ejected through the canopy.

In other embodiments, intended for aircraft having impenetrable canopies, the system incorporates arrangements for releasing the canopy so that it may move clear of the path of, and/or be pushed aside by, the upwardly moving ejection seat. In certain cases aircraft having impenetrable canopies also have little available space for storing compressed air for such a system, and when the upward movement of the seat is utilised to displace the canopy the energy absorbed in this way may so deplete the available stored energy as to impair the performance of other functions in the system.

Ejection seats normally employed in such systems have leg-restraining gear for the seat occupant, this gear including leg-restraining lines the ends of which are secured to the floor of the aircraft by attachments that shear during ejection of the seat. However, the slow movement of the seat when displacing a cockpit canopy and propelled by relatively little stored energy provides little inertia to assist shearing of the leg-restraining line attachments and the stored energy may, in some circumstances, be inadequate to effect shearing and in any event will be additionally depleted to the detriment of other functions of the system.

An object of this invention is to provide a latch operable by fluid pressure and particularly suited to use as a leg-restraining line attachment in such an ejection system, the use of such latch to release the leg-restraining lines at the appropriate instant utilising less energy than that required to shear a normal attachment during ejection from a submerged aircraft.

Thus, according to this invention, there is provided a latch comprising at least one fluid pressure-operable piston and cylinder device, including a pair of pistons movable by fluid supplied thereto, each piston being adapted to act on mechanism associated with a latch-locking member to move said member from a locked to an unlocked position, said locking member normally being biased by spring means to a locked position.

Each said piston may telescope over a guide plug and preferably said means for urging said latch-locking members to their locked positions may be housed, at least partially, within each said piston.

In order that this invention may be more readily understood an embodiment of the latch will now be described by way of example, and with reference to the accompanying drawings in which:

FIGURE 1 is a plan view and,
FIGURE 2 is a section on the line II–II of FIGURE 1.

The latch comprises a housing 1 enclosing a pair of spring-biased hollow pistons 2 positioned in opposition in a common cylinder 3, said spring-biassing being obtained by a pair of compression springs 4, one positioned within each of the pistons.

Each piston is guided partly by the cylinder 3 and partly by an axially bored guide plug 5 positioned at the appropriate end of the cylinder 3, each plug 5 extending telescopically over the respective piston 2.

A presure fluid inlet 6 in the housing communicates with a port 7 in the cylinder at a position between the two opposed pistons 2, this position being approximately midway along the length of the cylinder 3. Sealing rings 8 are provided around the pistons 2 to provide a fluid-tight seal between each piston 2 and the cylinder 3.

Each of the pistons 2 has a pair of radial projections 9 and 10, the projection 9 riding in a slot or groove 11 provided in the housing 1 and the projection 10 being formed to engage an annular groove 12 provided at one end of an associated locking member 13. Each locking member 13 is in the form of a plunger reciprocable in a bore 14 in the housing 1 and having a locked position into which it is urged by the spring-biassing of its associated piston 2 and in which it traverses a transverse slot 15 in the housing 1, said slot being adapted to receive a lug on a leg-restraining line, such a lug being indicated diagrammatically in dot-and-pick lines and being referenced 16.

When pressure fluid is ducted to the said port 7, in the cylinder 3 between the two pistons 2, the spring-biassing of the pistons 2 is overcome and the pistons 2 are forced to travel along the cylinder 3 away from one another. This movement causes the locking member 13 engaged by the pistons to move from their lug-locking positions to clear the slots 15, thereby to free leg-restraining line lugs normally retained in the said slots by the locking members 13.

I claim:

1. A latch comprising at least one fluid pressure-operable piston and cylinder device including two pistons movable by pressure fluid supplied thereto; a latch-locking member and a guide plug associated with each said piston, each piston telescoping partly over its associated guide plug; spring-biassing means urging each said latch-locking member to a locking position and comprising spring means acting between each said plug and its associated piston; and mechanism operable by said device for moving said latch-locking members to unlocked positions.

2. A latch according to claim 1, including a radial projection on each said piston for engagement with the associated latch-locking member.

References Cited by the Examiner
UNITED STATES PATENTS

| | | | |
|---|---|---|---|
| 2,276,990 | 3/1942 | Long | 294—83 X |
| 2,499,107 | 2/1950 | Miller | 244—151.1 |
| 3,027,126 | 3/1962 | Wallace | 244—141 |
| 3,179,359 | 4/1965 | Martin | 244—122 |

BERNARD A. GELAK, *Primary Examiner.*